May 18, 1965     J. KREIDICH     3,183,829
CHECK WRITING MACHINE
Filed Dec. 11, 1962     4 Sheets-Sheet 1
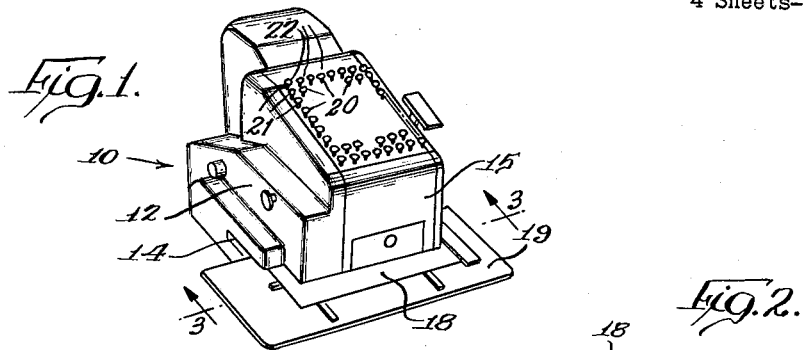
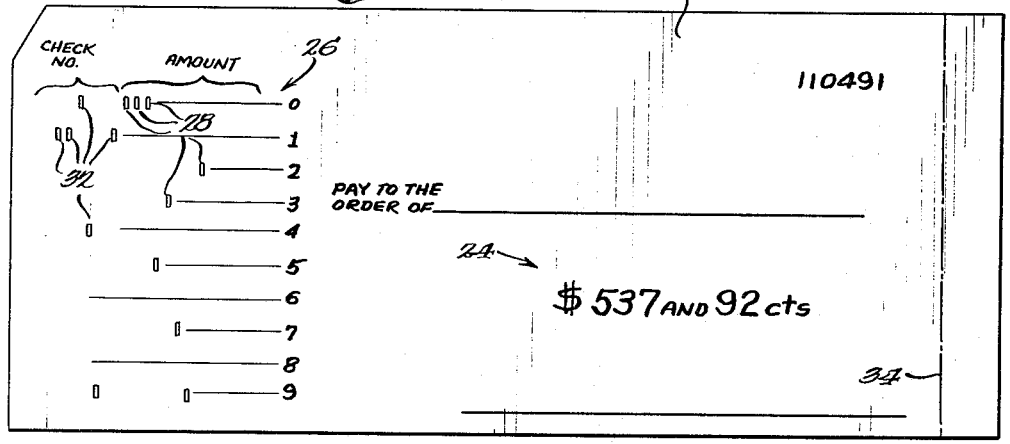
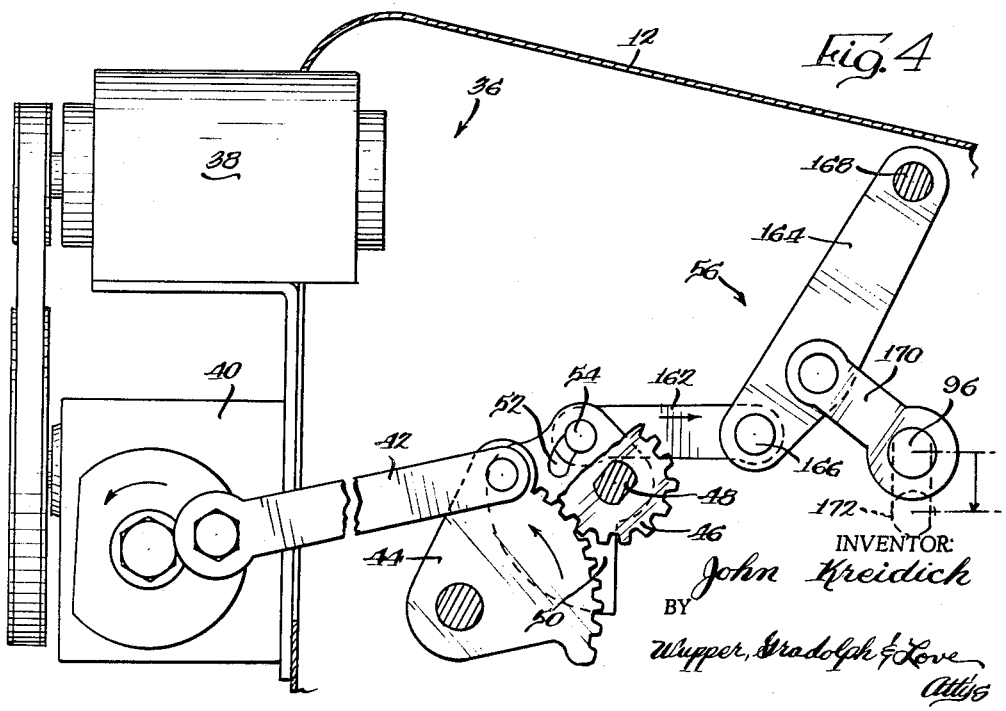
INVENTOR:
John Kreidich
BY Wupper, Bradolph & Love
ATTYS

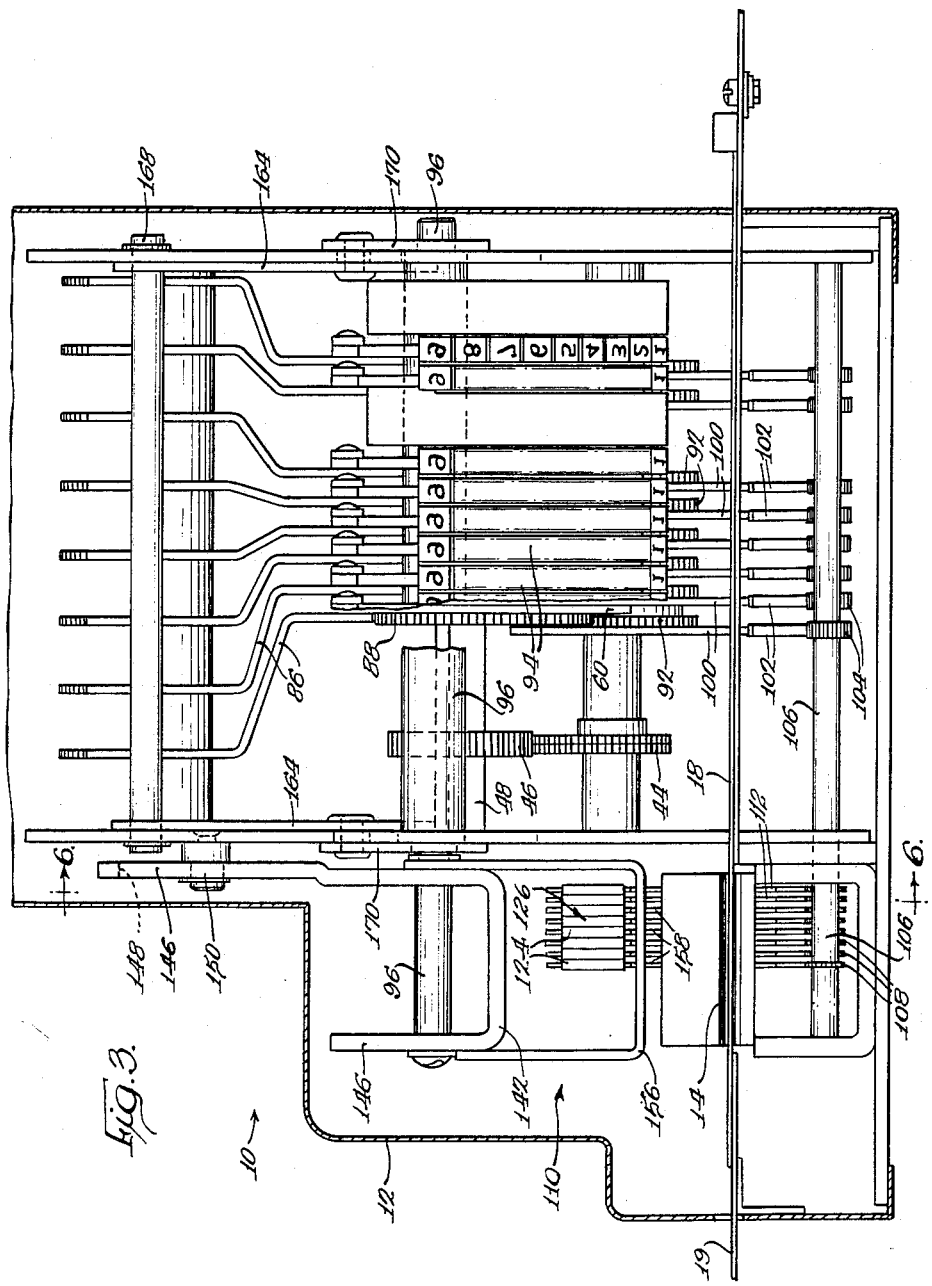

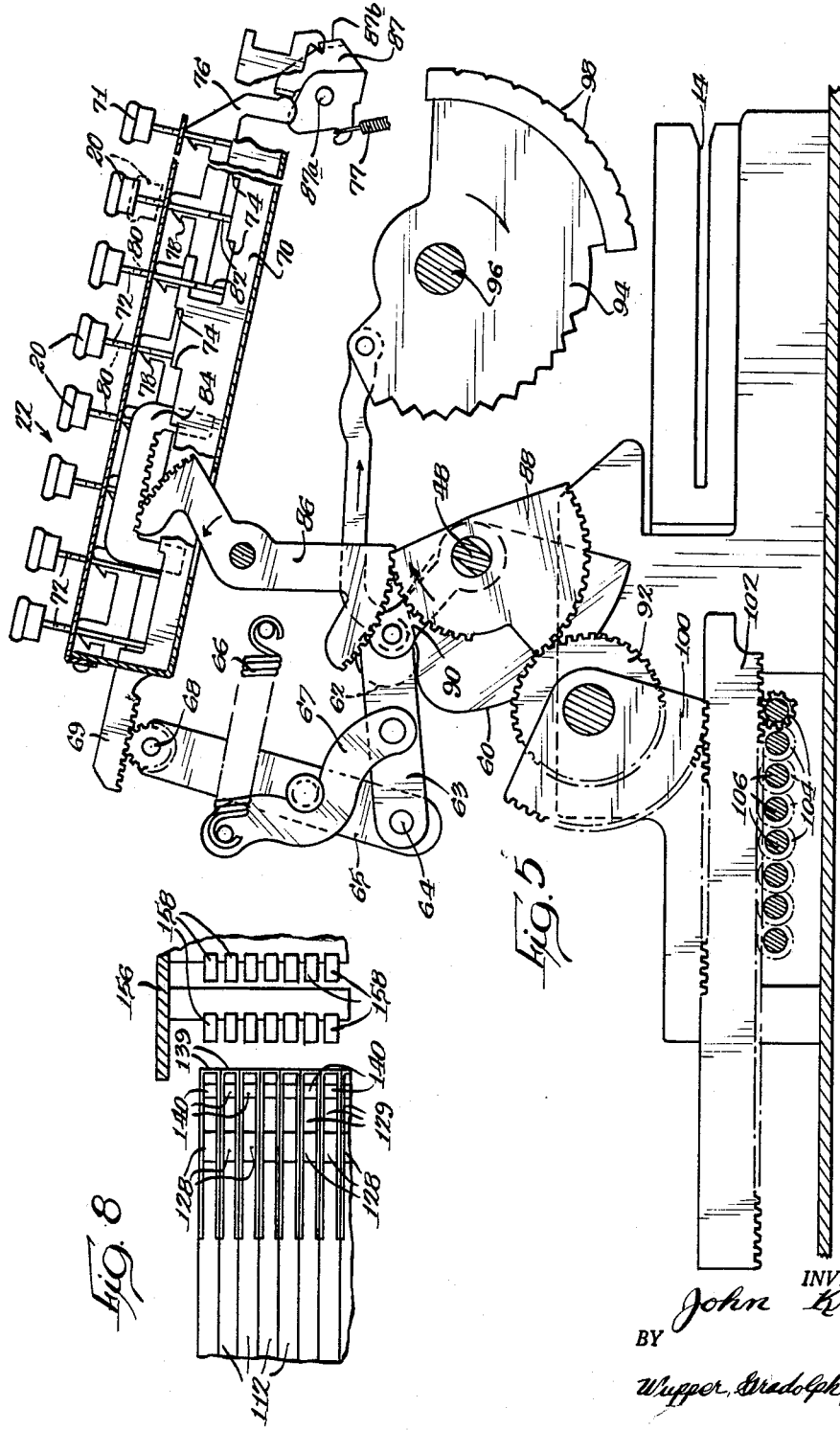

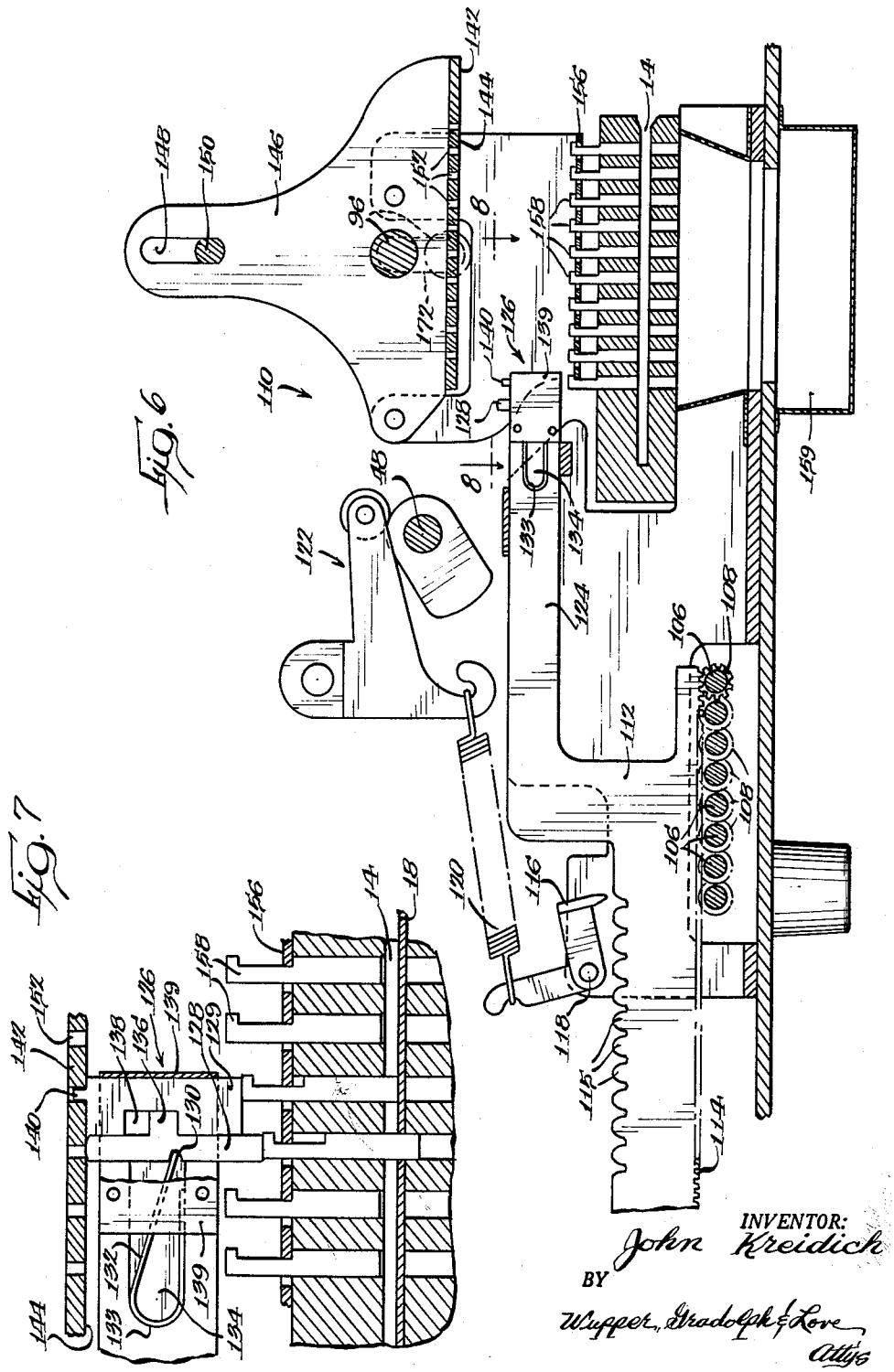

United States Patent Office 3,183,829
Patented May 18, 1965

3,183,829
CHECK WRITING MACHINE
John Kreidich, Chicago, Ill., assignor to The Hedman Company, Chicago, Ill., a corporation of Delaware
Filed Dec. 11, 1962, Ser. No. 243,840
9 Claims. (Cl. 101—19)

This invention relates in general to a key punch arrangement for a check writing machine and more particularly to an arrangement for key punching a check with zero markings for nonsignificant digit orders while the significant digits are both key punched and printed on the check.

The usual check writing machine incorporates a plurality of keys for each digit order with each key in a respective order assigned a different digit value from one to nine. The keys are selectively operated to cause the machine to print a desired amount upon a check and one or more tabulating cards also known as register copy associated with the check. The check and cards are also simultaneously key punched in accordance with the printed amount so that a tabulating machine record may be made of the cards. The check is subsequently compared automatically with the record in a process commonly known as collating.

The tabulating machine usually incorporates a field having eight digit orders for comparison with the key punched portion of the check which may have up to an eight digit number printed thereon and key punched therein. Since most checks are printed in amounts requiring considerably less than eight digits, the complete field of the tabulating machine will not be used in the comparison or collating process, as the check will have no markings or indicia for the unused or nonsignificant digit orders. Nonsignificant digits or digit orders as referred to hereinafter are those available digit orders higher than those used in printing an amount upon a check and are sometimes referred to by various terms such as high order zeros or insignificant zeros. Since the check does not usually have nonsignificant digit markings, a comparison for the full eight digit orders of the tabulating machine field is not possible, and therefore a source of possible error or fraud is present.

The operator in printing the check may of course provide nonsignificant digit markings by additionally operating keys corresponding to zero for the nonsignificant digit orders if such keys are provided and they usually are not. This would permit key punching a zero marking for nonsignificant digit orders, but the additional operations are of course time consuming and increase the possibility of error. Also, this would result in printing the nonsignificant digits and in the usual machine this is undesirable. The acceptable practice is that only the three lower digit order positions may have a zero both key punched and printed therefor without the operation of a key for a higher digit order. This creates a problem since it is necessary that the printing apparatus be rendered ineffective for printing zeros for the nonsignificant digits while the key punch apparatus is rendered effective to automatically key punch the check with nonsignificant digits and the significant digits must be both printed and key punched.

To avoid this problem, the present invention utilizes an improved arrangement for a check writing machine whereby both a check and the tabulating cards are automatically key punched with a zero marking in each nonsignificant digit order while only the significant digits are both printed and key punched. A nonsignificant digit order, as explained above, is an available digit order on the machine, higher than that used in printing a particular amount on a check.

It is therefore a primary object of the present invention to provide an improved check writing machine in which a check is automatically key punched in each digit order available on the machine irrespective of whether each digit order is used or not to print an amount on a check.

It is a further object of this invention to enable unused higher order digit positions on a check to be automatically marked by a check writing machine in response to the operator setting keys corresponding to lower order digit positions on the machine.

Briefly, the invention utilizes a simple sectionalized pressure bar assembly for each digit order with all of the assemblies adapted to be operated by a common pressure plate for perforating the check and tabulating cards. Each assembly is operated to a position corresponding to the operated key in the corresponding digit order and if no key is operated for the digit order, the assembly remains in its normal position. The pressure plate is formed so that if an assembly is positioned in accordance with a digit other than zero, one pressure bar of the assembly is operated to perforate the check in a position corresponding to that digit, but if the assembly remains in its normal position, another pressure bar is operated by the plate to automatically perforate the check in a position corresponding to zero.

The above and other objects of the present invention will become more apparent on examination of the following specification and claims together with the drawings, wherein FIG. 1 is a perspective view of a check writing machine including a keyboard;

FIG. 2 illustrates the face of a typical tabulating card check written by a key punch check writing machine;

FIG. 3 is a generally vertical sectional view taken along the line 2—2 of FIG. 1 showing the printing and punching mechanisms, their interconnection, and a portion of the driving mechanism therefor;

FIG. 4 illustrates the basic drive mechanism of the machine;

FIG. 5 is a vertical sectional view illustrating the linkage between the keys and the printing and perforating assembly and the connection to the drive mechanism;

FIG. 6 is a vertical sectional view through the perforating assembly for perforating the check and tabulating cards and may be considered as being taken along the line 6—6 of FIG. 3;

FIG. 7 is an enlarged sectional view through the pressure bar assembly; and

FIG. 8 is a plan sectional view taken along the line 8—8 of FIG. 6.

Referring now to the drawings, a check writing machine is generally indicated in FIG. 1 by the reference character 10. The check writing machine comprises a housing 12 having a slot 14 in its front vertical face 15 to permit the reciprocation of a tabulating card check 18 into and out of the machine. A carriage or shelf 19 is utilized to position and reciprocate the check into the slot, but it is believed unnecessary to complicate the specification by describing the shelf action in detail since it forms no part of the invention. One or more tabulating cards (not shown) may be located beneath the check with carbon paper therebetween so that printed indicia may be produced on both the check and cards together with the perforation of the cards and check in a manner corresponding to the printed indicia. Protruding from the upper face of the housing is a matrix of keys 20 comprising a series of rows 21 individual to the digits one to nine and a series of columns 22 individual to respective digit orders.

The check 18, as will be seen in FIG. 2, comprises an area 24 in which printed indicia corresponding to the significant digits appear, and in the example shown, a five digit number is utilized to express a particular dollar amount. To the left of the area 24 is another area 26 separated into eight columns corresponding to the respective digit orders and to the respective columns 22. The area 24 is also separated into a series of rows corresponding to the respective digits zero to nine. Each column has a perforation 28 therein lying in the row corresponding to one of the values zero to nine for the purpose of providing a permanent record on the check corresponding only to the amount appearing in area 24. In the example shown, the first three high order or nonsignificant digit columns in area 26 are perforated in the row corresponding to zeros, while the remaining columns are perforated in rows corresponding to the number appearing in area 24. Thus all eight digit orders including nonsignificant digit orders are marked in area 26 to permit a full field comparison with the tabulating machine record. A last area just to the left of area 26 contains a series of perforations 32 in respective columns and rows for indicating the check number. The latter perforations are produced in an appropriate machine.

Both the printed indicia in area 24 and the perforations 28 are provided by the check writing machine 10 and similar indicia and markings are provided on the tabulating cards located beneath the check 18. The tabulating cards may be separated from the check along a crease mark 34 in a conventional manner and used for a tabulating machine record. Thus, the check may be subsequently compared with the tabulating machine record by means of the perforations 28 in any well known manner.

In FIG. 4, a driving arrangement or assembly 36 is indicated. The driving assembly 36 is contained within the housing 12 and comprises a motor 38. The motor is energized by means of a trip bar switch (not shown) after the keys 20 have been depressed and the check 18 inserted within the slot 14. The motor 38 drives a speed reducing transmission assembly indicated by the block 40 for operating a bell crank assembly 42.

The bell crank assembly 42 reciprocates a gear segment 44 which in turn drives a gear segment 46 located on a lever shaft 48. The lever shaft 48 hours thus rotates a cam 50 having an arcuate slot 52 therein. A pin 54 is engaged in the slot 52, and it is connected to a drive link assembly 56, but since the slot 52 must traverse a predetermined distance before it can move the pin 54, the drive link assembly 56 remains stationary for an interval corresponding to said predetermined distance.

During this interval, the lever shaft 48 drives a lever cam 60 illustrated in FIG. 5. The lever cam 60 in turn operates a follower 62 which is rotatably mounted on an arm 63. The arm 63 is connected to a shaft 64 which carries one end of a yoke 65 which is biased for rotation by a spring 66 connected to a slip clutch 67. The arm 63 and the yoke 65 are connected together by the slip clutch 67. The entire assembly then rotates about shaft 64. At its upper end the yoke 65 carries a series of coaxially mounted pinions 68, only one of which is illustrated. Thus one pinion 68 is provided for each column 22 of keys 20.

Each pinion 68 has associated therewith a rack portion 69 of a segment driver 70 adapted to be controlled by any key 20 in a respective column 22. Thus, when the lever cam 60 is operated, it moves the follower 62 upward to cause yoke 65 to pivot in the counterclockwise direction about the axis of shaft 64 and thereby translates the pinions 68. This carries the rack portions 69 and the respective segment drivers to the left as seen in FIG. 5. A lower rack portion corresponding to rack portion 69 may also be provided for the pinions 68, but its operation is incident to rack portion 69.

The keys 20 each comprise a button portion 71 and a spring biased standard 72 for carrying the button. Each segment driver 70 is provided with a series of stop surfaces 74 with each stop surface 74 adapted to engage a respective key standard 72 for limiting the distance travelled by the segment driver in accordance with the operated key.

The standards 72 in each column are each normally engaged by a respective spring biased key lock slide 76 and when one of the key standards in the column is depressed, the key lock slide 76 is shifted to the right, as seen in FIG. 5, against the bias of a spring 77. With the key fully depressed, a detent 78 on the key lock slide is engaged with an aperture 80 in the operated standard to lock the same in its depressed position. A shoulder 82 on the key standard is then in position to be engaged by a corresponding surface 74 on the segment driver, and when this occurs, further movement of the segment driver 70 is terminated, although the respective pinion 68 will now continue to move toward the left under the influence of the movement of yoke 65, since the pinion is free to rotate and thus roll over the rack portion 69 of any stopped segment driver.

Thus, each depressed key controls the movement of the associated segment driver 70 so that the driver assumes a position correspondings to the operated key, while if no key is operated, the segment driver simply remains in a clearance or unoperated position. Each segment driver also has a rack 84 which is translated in response to the movement of the driver 70, and each rack 84 operates a respective step-up gear 86.

Any unoperated segment driver 70 of course does not operate its associated gear 86 unless a key corresponding to a higher digit order has been operated. In this case a carry-over mechanism, only a portion of which is shown, is operated. This a carry-over bracket 87, mounted on a shaft 87a, is controlled by its associated lock slide 76 in any well known manner to rotate a detent 87b. This permits a segment driver associated with the next lower digit order to be moved against a zero stop for enabling printing of a zero for the lower digit orders.

Each operated step-up gear 86 in turn rotates a respective segment link gear 88 about the lever shaft 48 to a position corresponding to the respective operated key. Each segment link gear 88 has associated therewith a segment link 90 and a transfer gear 92, and these are operated in response to the rotation of gear 88. The segment link 90 rotates a type segment 94 about a main shaft 96 to a position corresponding to the numeral value of the operated key. Each segment 94 has a series of type face positions 98 thereon, one of which is now positioned to enable a value corresponding to the operated key to be printed on the check 18.

The segments 94 are provided with ten type face positions. In the event a segment 94 was unoperated and a higher order segment was operated, the carry-over mechanism mentioned previously controls the setting of the lock slide for printing of zero in a position corresponding to the lower order digit. If no key in a higher order digit position is operated, however, the carry-over mechanism is ineffective and no zero type face is brought into operation in accordance with customary practice.

Each operated transfer gear 92 in turn is connected to and operates a gear segment 100 and it in turn displaces a pinion rack 102 to a position corresponding to the operated key. The rack 102 rotates a respective pinion 104 of a group of pinions through a distance corresponding to the respective operated key. Each pinion 104 is mounted on a shaft 106 which transfers this motion to a respective pinion 108 associated with a perforating assembly 110 shown in FIG. 6.

The perforating assembly 110 is associated with the area 26 when the check 18 is properly positioned in slot 14 and it is adapted to provide key punches 28 in the columns and rows in area 26. The assembly 110 comprises a series of selector slides 112, each having a rack portion 114 whereby it is adapted to be operated by a pinion 108 mounted on one of the shafts 106 in response to the movement of its shaft 106 and the corresponding pinion 104.

Each selector arm 112 has a series of teeth 115 along its upper edge, and these are adapted to be engaged by a detent 116. The detent 116 is pivoted at 118 and is biased by a spring 120 connected to a follower arm assembly 122. The follower arm assembly is adapted to be operated by the lever shaft 48 in response to its rotation for pivoting the detent into engagement with the teeth 115 so that the slides 112 remain in the position to which they are operated by the respective pinions 108.

Each selector slide 112 also has a forwardly projecting leg 124. A pressure bar assembly 126 is carried at the end of each leg 124. The pressure bar assembly 126 is sectionalized and comprises two pressure bars 128 and 129, as best seen in FIG. 7.

The bar 128 has a recess 130 in which one leg 132 of a U-shaped spring 133 is seated. The spring is carried in a recess 134 at the end of leg 124 and it serves to bias the pressure bar 128 upwardly. The pressure bar 128 thus projects above the level of the leg 124.

The bar 128 carries a tab 136 along its right edge and this tab engages a recess 138 in pressure bar 129. The tab 136 normally engages the upper wall of the recess 138 under the influence of spring 133 to bias pressure bar 129 upwardly. A U-shaped bracked 139 mounted on the end of leg 124 serves to hold the two pressure bars 128 and 129 properly engaged with the end of leg 124.

Although the pressure bar 129 is wider than pressure bar 128, its upper end is cut away to leave a small projecting tab 140 level with the upper edge of bar 128. Either bar 128 or 129 is thus adapted to be engaged by a pressure plate 142.

The pressure plate 142 comprises a generally horizontal face 144 and vertical side legs 146 carried by the main shaft 96. One of the side legs has a slot 148 therein engaged by a guide pin 150 so that the pressure plate may move vertically with the main shaft 96 but does not rotate.

The face 144 has a series of ten spaced apart recesses 152 therein. They are spaced apart by the distance corresponding to consecutive digits and a respective one is aligned with tab 140 whenever a selector slide 112 is moved in response to the operation of any of the keys in the respective column. The recesses traverse all the bars 129, and each is adapted to receive the tab 140 on bar 129 while the top edge of the bar 128 is engaged by face 144 and bridges the recess directly behind the recess engaging tab 140. Thus, when the pressure plate 142 is moved downwardly, the bar 128 on any operated selector slide 112 will be depressed responsive to the movement while the tab 140 on bar 129 is engaged in one of the recesses 152, as indicated in FIG. 6, and therefore has only a limited response to the pressure plate movement. On retraction of the pressure plate the spring 133 will of course return the bars to normal.

It will be noted that a selector slide 112 remains unoperated in the event no key 20 in the respective digit order was depressed and no key in a column corresponding to a higher digit order is depressed. Only tab 140 on bar 129 is then adapted to be engaged by the pressure plate 142 since bar 128 is not then in position to be engaged by face 144. Thus, in the event no key is depressed for the particular selector arm and it corresponds to a nonsignificant digit order, bar 129 will be depressed by the pressure plate 142. Bar 129 will carry bar 128 downwardly and on release, the spring 133 will return both bars to their normal position.

A stripper 156 and a series of ten key punches 158 are located beneath each selector leg 124. The key punches correspond to the various digits zero to nine and are arranged to perforate a corresponding row in a respective column of area 26 in the check 18 and tabulating cards when they are positioned in slot 14. Thus, if a particular selector slide 112 is not operated, the bar 129 thereon is positioned over the key punch 158 corresponding to zero and will engage that key punch to perforate the check accordingly in response to the movement of the pressure plate 142 so that a zero marking will be key punched for the nonsignificant digit order. The bar 128 in that event will not engage a key punch 158.

If a selector slide 112 is operated in response to the depression of a key 20 in the corresponding digit order, the bar 128 will be positioned over a key punch 158 corresponding to the operated key. If the selector slide is positioned in response to the operation of a key in a higher digit order, the bar 128 will be positioned over the key punch 158 corresponding to zero. In either event the face 144 of pressure plate 142 will operate the bar 128 into engagement with the corresponding key punch 158 to perforate the check accordingly while the tab 140 on bar 129 is simply engaged in one of the recesses. One of the key punches 158 corresponding to one of the digits zero to nine therefore key punches or perforates the check in accordance with the significant digits. The chads resulting from the perforations will fall into the chad box 159 located beneath the slot 14.

The pressure plate 142 operates after the aforementioned interval preceding operation of drive link assembly 56. During that interval the selector slides 112 have been positioned. When the back edge of slot 52 engages pin 54 at the end of the interval, it operates the drive link assembly 56. The drive link assembly 56 comprises arms 162 and 164 pivotally connected at 166. The arm 162 moves to the right in response to the movement of pin 54 and it pivots arms 164 counterclockwise about axis 168. The main shaft 96 is pivotally connected to arm 164 by a crank arm 170 and it responds to the movement of arm 164 by shifting downwardly, as shown by dotted lines 172 in FIGS. 4 and 6, to carry the pressure plate 142 downwardly for the described engagement with bars 128 and 129 and the printing segments 94 to printing position.

Recapitulating the operation of the check writing machine 10, it will be appreciated that a tabulating card check 18 is positioned in slot 14 so that area 26 lies beneath the key punches 158 and area 24 lies beneath the type segments 94. The keys 20 in respective columns 22 corresponding to the amount to be printed on the check are operated, and a switch (not shown) is then operated to energize motor 38.

The motor 38 drives the lever shaft 48 through the transmission 40 and bell crank 42 to set the segment driver 70 associated with each column 22 of keys to a position corresponding to the operated key in the respective column or to a zero position if a key in a higher digit order column is operated. The segment drivers 70 associated with columns 22 corresponding to nonsignificant digits remain unoperated.

The type segments 94 corresponding to the operated segment drivers are then set to a position corresponding thereto, through the links 90. In the case of unoperated lower order segment drivers the carry-over mechanism is effective to move the segment drivers and segments so that the zero indicia may be printed on the check for each significant digit order. The pinion racks, pinions 104 and 108 and the selector arms 112 corresponding to the operated segment drivers 70 are also positioned in accordance with the respective operated keys, while the selector arms 112 corresponding to the higher or nonsignificant digit orders remain in their normal position.

The positioned selector slides carry the bars 128 over a key punch 158 corresponding to the respective significant digits, while the bars 129 of the unoperated selector arms remain positioned over the key punch 158 corresponding to zero.

The main shaft 96 is then operated by the driver assembly 56 to carry the pressure plate 142 and segments 94 downwardly. The type segments 94 cause the indicia to be printed on the check in area 24, while the pressure plate 142 operates bars 128 and 129 to cause the key punches 158 to perforate the tabulating card check in the rows of area 26 corresponding to the printed indicia and to zero for the nonsignificant or higher digit orders than those used in the printed indicia.

As the bell crank 42 continues its cycle, the slot 52 is retracted from pin 54 to its normal position, thus allowing the main shaft 96 to return to normal in a conventional fashion. The segments 94 and the pressure plate 142 therefore return to normal allowing springs 133 to return the respective pressure bars 128 and 129 to normal. During the retracting movement of the bell crank 42, the lever shaft 48 is rotated towards its normal position so that the cam 60, pinions 68 and the segment drivers are returned to their normal position. A release arrangement (not shown) but of conventional design retracts the lock slide 76 during this portion of the bell crank movement so that the detents 78 are withdrawn from the apertures 80 in the key standards 72 thus permitting the keys 19 to return to normal under their spring bias. The spring 77 acts to place the lock slide 76 in its normal position. As the bell crank completes its cycle, the energizing current for the motor 38 is terminated in any well known manner.

The foregoing description describes one embodiment of the invention, which is believed capable of many adaptations and modifications, whose limitations are set forth in the following claims.

I claim:

1. In a check writing machine having a plurality of numeral keys arranged in columns wherein each column of keys of the plurality of columns of keys is adapted to correspond to either a significant or nonsignificant digit order depending on whether a key in the column or in a column corresponding to a higher digit is operated, said keys being connected to operate a check printing mechanism, the improvement comprising a series of key punches for each column of keys with each key punch in a series corresponding to one of the digits zero to nine and connected to be selectively operated for key punching a check in accordance with digit value in the digit order, means individual to each series of key punches for operating any one key punch in a series to key punch said check, and a selector slide for each column of keys mounting said key punch operating means in a position to operate the key punch corresponding to zero in the series, and means operated from the numeral keys to move said slide into a position for operating any key punch in the series corresponding to a significant digit upon operation of a numeral key in the column corresponding to a significant digit, and means for operating said key punch operating means for all the columns to punch the check with markings for all the digit orders.

2. The arrangement claimed in claim 1, in which the punching mechanism includes a pair of pressure bars for each digit order adapted to be selectively positioned by the selector slide for that digit order for key punching said check, the positioning of said pressure bars depending on whether said digit order corresponds to a significant or nonsignificant digit.

3. The arrangement claimed in claim 2, in which a single plate is provided for operating said pressure bars.

4. The arrangement claimed in claim 3, in which said plate is provided with a series of spaced apart recesses and one of said pressure bars is adapted to be engaged in any one of said recesses if the respective digit order corresponds to a significant digit.

5. In a check writing machine having a plurality of numeral keys arranged in columns corresponding to respective digit orders adapted to be either significant or nonsignificant depending on which keys are operated for printing a check with a particular value, the improvement comprising a series of key punches for each column of keys with each key punch in a series corresponding to one of the digits zero to nine, a selector slide for each column of keys connected to be either operated into a position corresponding to any operated key in the corresponding column of keys or operated into another position if only a key in a column corresponding to a higher digit order is operated, one pressure bar for each selector slide positioned for engagement with a key punch corresponding to zero in the series of key punches, another pressure bar for each selector slide for engaging any key punch in the series if said selector slide is operated into a position corresponding to an operated numeral key, and last means for simultaneously operating the one pressure bar associated with one selector slide into engagement with the zero key punch if the respective selector slide is unoperated and for operating the other pressure bar associated with another selector slide if said other selector slide is operated, into engagement with a respective key punch whereby a check is key punched with markings corresponding to both siginficant digits and nonsignificant digits.

6. In the arrangement claimed in claim 5, means for carrying both said pressure bars on a selector slide, and means for biasing both said pressure bars into a predetermined position.

7. The arrangement claimed in claim 5, in which said last means comprises a pressure plate having a face traversing all of said key punches and having a plurality of recesses therein for receiving each of said one pressure bars in the event the respective selector slide is operated.

8. A check writing machine having columns of keys for key punching a check in each of a series of columns corresponding to digit orders certain of which correspond to significant digit orders and others of which correspond to nonsignificant digit orders, the improvement comprising a selector slide for each column of keys, a series of key punches for each selector slide with each key punch in a series corresponding to one of the digits zero to nine, a pressure bar assembly carried by each selector slide, each assembly comprising a pair of bars, one bar of each pair normally adapted to be engaged with a key punch corresponding to zero in the series of punches whenever the slide is in its normal position, means for moving each selector slide in response to the operation of a key either in the column corresponding to the arm or in a column corresponding to a higher digit order to carry the assembly to any one of a plurality of other positions whereby the other bar of each pair is adapted to be engaged with any one of said key punches in the series, and a pressure plate common to all of said series of key punches and arranged to move each one bar into engagement with zero key punch for key punching a check in a column corresponding to each nonsignificant digit order if the selector slide carrying said one bar is in its normal position and also arranged to operate said each other bar into engagement with any punch in a series of key punches if the selector slide carrying said other bar is moved to thereby key punch said check in a column corresponding to each significant digit with the corresponding significant digit value.

9. In a check writing machine having a plurality of keys arranged in columns corresponding to digit orders and connected to operate a printing mechanism for printing indicia on a check in accordance with a value assigned to each operated key, the improvement comprising a series of key punches for each column of keys with each key punch in a series corresponding to one of the digits zero to nine, one pressure bar for a column of keys positioned for engagement with a key punch corresponding to zero in the series of key punches, another pressure bar for each column of keys mounted to be operated into a position for either engaging a key punch corresponding to an operated key in the digit order or engaging a key punch corresponding to zero in the event a key corresponding to a higher order digit is operated, and a single pressure plate common to all of said bars and arranged to operate said one pressure bar in the event each key in the column of keys and each key in each higher order column of keys is unoperated, into engagement with the zero key punch to key punch said check accordingly and arranged to operate each other pressure bar associated with each value to be printed on said check into engagement with a key punch for key punching said check in accordance with said printed indicia.

References Cited by the Examiner

UNITED STATES PATENTS

| | | | |
|---|---|---|---|
| 1,430,014 | 9/22 | Hyman | 101—19 |
| 1,701,053 | 2/29 | Pierce | 101—19 |
| 2,195,844 | 4/40 | Von Pein | 101—19 |
| 2,521,372 | 9/50 | Houston | 101—19 |
| 2,737,241 | 3/56 | Doty | 234—24 X |
| 3,034,426 | 5/62 | Maier | 101—19 |

FOREIGN PATENTS 423,265  1/35  Great Britain.

WILLIAM B. PENN, *Primary Examiner.*